United States Patent [19]
Korpi

[11] Patent Number: 5,141,299
[45] Date of Patent: Aug. 25, 1992

[54] ROAD WHEEL WITH INTEGRAL WEAR PLATE

[75] Inventor: John G. Korpi, Livonia, Mich.

[73] Assignee: The United States of America as represented by the Secretary of the Army, Washington, D.C.

[21] Appl. No.: 722,816

[22] Filed: Jun. 28, 1991

[51] Int. Cl.⁵ .............................. B62D 55/12
[52] U.S. Cl. ........................... 305/56; 305/57
[58] Field of Search ............ 305/29, 56, 57, 60, 305/21, 24, 27, 28

[56] References Cited

U.S. PATENT DOCUMENTS

| | | | |
|---|---|---|---|
| 1,645,089 | 10/1927 | Burdette | 152/323 |
| 4,208,073 | 6/1980 | Hechinger | 152/323 X |
| 4,607,892 | 8/1986 | Payne et al. | 305/56 |

FOREIGN PATENT DOCUMENTS

| | | | |
|---|---|---|---|
| 1939239 | 7/1977 | Fed. Rep. of Germany | 305/56 |
| 813066 | 6/1937 | France | 305/56 |

Primary Examiner—Russell D. Stormer
Attorney, Agent, or Firm—Peter A. Taucher; David L. Kuhn

[57] ABSTRACT

The invention is an improved road wheel assembly for a tracked vehicle such as a tank. The improvement is a wear ring in the spiders of the road wheel for protecting the spiders from abrasion by center guides of the vehicle track. The spiders define annular pockets to retain the wear rings and the wear rings are comprised of a matrix material with ceramic particle distributed therein. The matrix material is tougher and more flexible than both the metal of which the spiders are made and the particles whereas the particles are harder and more abrasion resistant than the matrix material or the spiders.

8 Claims, 2 Drawing Sheets

ROAD WHEEL WITH INTEGRAL WEAR PLATE

GOVERNMENT USE

The invention described herein may be manufactured, used and licensed by or for the U.S. Government for governmental purposes without payment to me of any royalty thereon.

BACKGROUND

Vehicles such as tanks have tracks comprised of individual track units linked together in a continuous loop travelling around an idler wheel, a sprocket and a set of road wheels. The road wheels roll upon the track units as these units engage the ground, the wheels being kept on the track by center guides projecting from the track units into circumferential channels in the wheels.

In some tanks, the road wheels are made of aluminum, which is softer than the material from which the center guides are made, whereby the center guides tend to destructively abrade the spiders of the road wheel. For these tanks, it is known to bolt wear plates of hardened steel onto the wheels to prevent abrasion of the spiders by the center guides. While the wear plates do extend the life of the wheels, the wear plates themselves need continual replacement due to abrasion. The continual replacement raises the material and maintenance costs of operating tanks and decreases the tanks' degree of readiness.

SUMMARY OF THE INVENTION

My improved road wheel assembly minimizes spider abrasion by means of a novel wear ring closely fit in an annular pocket in the spider. The wear ring is made of ceramic particles imbedded in a tough, flexible matrix that can be filled into the pocket. The wear ring conforms to undercuts in the pocket and is thereby retained in the pocket without bolts or like fasteners. It is estimated that the wear ring will endure abrasion by the center guide at least five times longer than the presently used wear plate.

DETAILED DESCRIPTION

Figure 1:
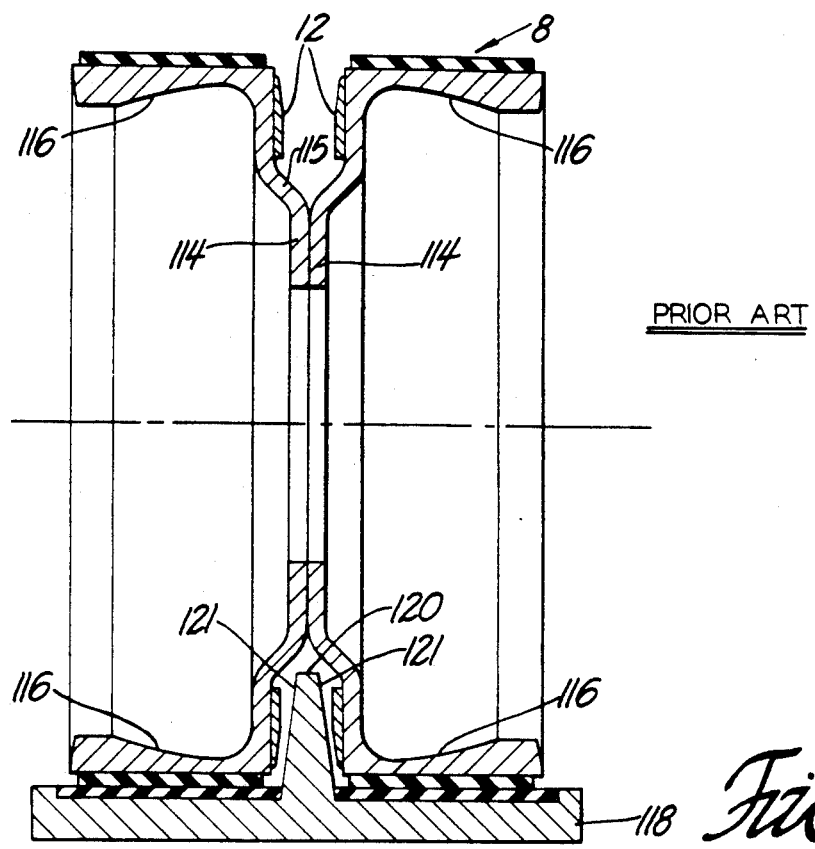
FIG. 1 is a sectional view of a conventional road wheel assembly engaged with a track unit.

In FIG. 1 is shown a conventional road wheel assembly 8 for a tracked vehicle such as the U.S. Army's M1A1 tank, the wheel rolling upon track unit 118. Road wheel 8 has two aluminum wheel halves, each half being C-shaped in cross section and comprising a spider 114 integral with a rim 116. The wheel halves are joined by bolts (not shown) and radially outer zones of the spiders form circumferential channels 115. Fixed by bolts (not shown) to the side walls of channels 115 are steel wear plates 112 against which center guide 120 intermittently rubs as road wheel assembly 8 rolls upon track unit 118. Center guide 120 has flat rub surfaces 121 that face toward complimentary surfaces on wear plates 112.

Figure 2:
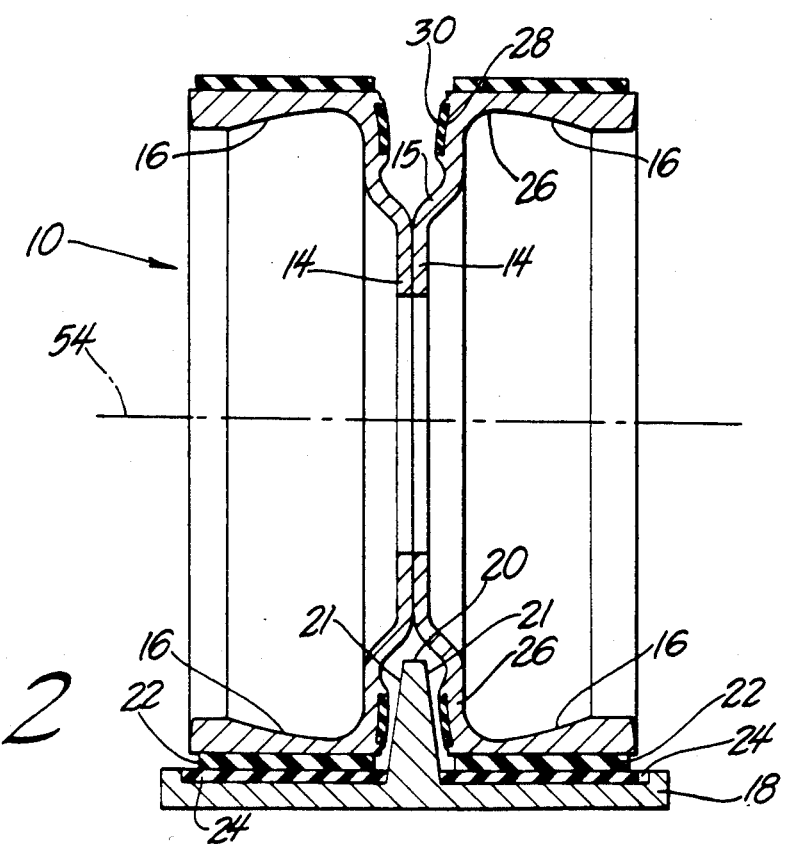
FIG. 2 is a sectional view of my improved road wheel assembly engaged with a track unit.

FIG. 2 shows my improved wheel assembly 10 which has two cross-sectionally C-shaped wheel halves, each wheel half comprising a spider 14 integral with a rim 16. The wheel halves are joined by bolts (not shown) through abutted portions of spiders 14, and the peripheral portions of spiders 14 form circumferential channel 15. Protruding into channel 15 is center guide 20 having flat surfaces 21 faced toward and intermittently bearing against flat, smooth surfaces 30 of wheel zones 26. Center guide 20 extends from track block 18, which also has rubber inserts 24 in contact with outer rubber casings 22 around flanges 16.

Figure 3:
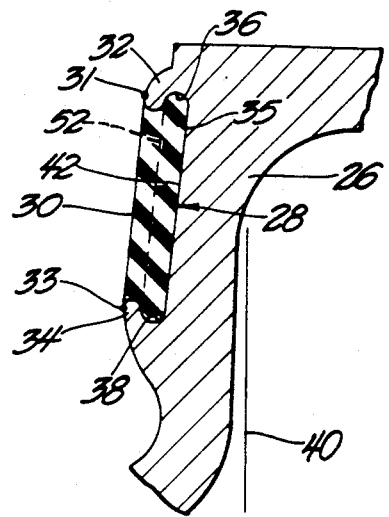
FIG. 3 is a detail view of the zone of my road wheel assembly containing the wear ring.

FIG. 3 is sectional detail view of wheel zone 26, which has a ring-shaped pocket 35 formed by flat bed 42, curved flange 32 at the outer diametrical edge of bed 42 and another curved flange 34 at the inner diametrical edge of bed 42. Flange 32, flange 34, rim 16 and spider 14 together form an integral component of a relatively light weight, soft metal such as aluminum. Pocket 35 includes rounded undercuts 36 and 38 which can be formed by known metal cutting techniques after the aforementioned integral component is cast or forged. The surface of undercuts 36 and 38 preferably has a rough finish. Such a finish is easier and less expensive to accomplish than a smooth finish and will cause enhanced adhesion between annular wear ring 28 and the undercuts.

Figure 4:
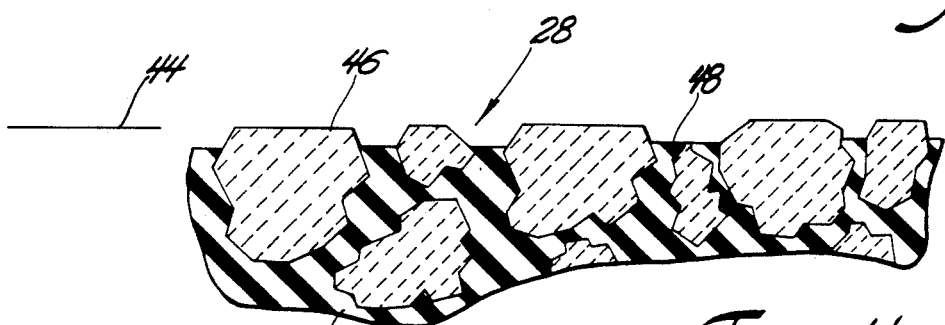
FIG. 4 is is a highly magnified view of the surface of the wear ring.

Annular ring 28 fits conformingly within pocket 35 and comprises a matrix material which adheres to the inner peripheral wall of the pocket. As seen in FIG. 4, particles 46 of a ceramic such as tungsten carbide or other hard substance are distributed within the body 50 of matrix material. Ring 28 has an uninterrupted, smooth, flat, generally axially facing surface 30 parallel to flat surface 21 (FIG. 2) on center guide 20. Bed 42 is preferably at least roughly parallel to surface 30 and surface 30 is disposed at an acute angle with a plane normal to rotational axis 54 of road wheel 10, that plane being represented by line 40 in FIG. 3. The acute angle is preferably between two and ten degrees, and a 5 degree angle would be typical. Surface 30 is also preferably flush with points 31 and 33 on the flanges, these points being the part of the flanges most remote from the plane defined by bed 42.

FIG. 4 is a greatly enlarged view of a portion of flat annular wear ring 28 at surface 30. Matrix body 50 is made from a substance such as an epoxy which has greater elasticity than the particles 46 and which adheres to the inner peripheral surface of pocket 35. Surface 48 of the matrix body 50 is recessed relative to the common plane represented by line 44 in which lie bearing surfaces of particles 46, the degree of recession being exaggerated for purposes of illustration. Ceramic particle surfaces interfaced with matrix body 50 are rough and irregular so that the strength of the physical lock between matrix body 50 and the particles is enhanced and so that the area of adhesion between matrix body 50 and particles 46 is increased. The FIG. 4 configuration can be achieved, for example, by a lapping operation wherein loose abrasive particles will remove the relatively softer matrix material to a greater depth than common plane 44.

When surface 21 of center guide 20 bears against surface 30 of annular wear ring 28 during rotation of road wheel assembly 10, the relative elasticity of matrix body 50 causes it to be squeezed toward common plane 44. There will be cases of extreme pressure between surfaces 21 and 30 during tight turns of the tracked vehicle having road wheel assembly 10. The matrix 48 will then be squeezed into contact with surface 21 and will be abraded. When the pressure between the surfaces decreases, matrix body 50 will recede to a new, greater depth relative to particles 46 due to the abrasion during contact with surface 21. Such a decrease in pressure will occur when the tracked vehicle subsequently follows a straight path or increases its radius of turn. During the subsequent straight or wide-turn travel of the vehicle, surface 21 will bear only against the surfaces of particles 46 in plane 44. These surfaces, because of their hardness, will be relatively smooth and the interstitial spaces between the particles will reduce the area of contact.

Because of the above-recited structure, several advantages will be realized. First, friction between the road wheel assembly and center guide 20 is reduced during the majority of vehicle travel time, when the vehicle is not executing tight turns. Also, ring 28 will be more wear resistant than conventional steel wear plate 12 (FIG. 1) because particles 46 are of a made of ceramic material harder than the plate. In addition the greater elasticity of matrix body relative to the plate makes ring 28 tougher and more resilient than the plate.

As surface 30 of annular wear ring is worn away by center guide 20, it is intended that the portions of flanges 32 and 34 near respective points 31 and 33 will wear away also. About one-half of the axial width of annular wear ring 28 must be worn away before enough of the flanges are lost to prevent them from retaining the wear ring. Thus flanges 32 and 34 are, at least in part, sacrificial elements.

It is possible to replace flanges 32 and 34 after they are worn and then to place a new wear ring in pocket 35. Both the replacement and original wear ring are emplaced by filling the pocket with the epoxy matrix mixed with ceramic particles 46 while the matrix is in a liquid or semi-liquid state, and then allowing the matrix to harden. However, it may prove to be more economical to replace the entire road wheel assembly 10. This choice is believed to be more economical than conventionally replacing wear plates 12 on road wheel assemblies 10 because annular wear ring 28 is estimated to last five or more times as long as wear plate 12.

Figure 5:
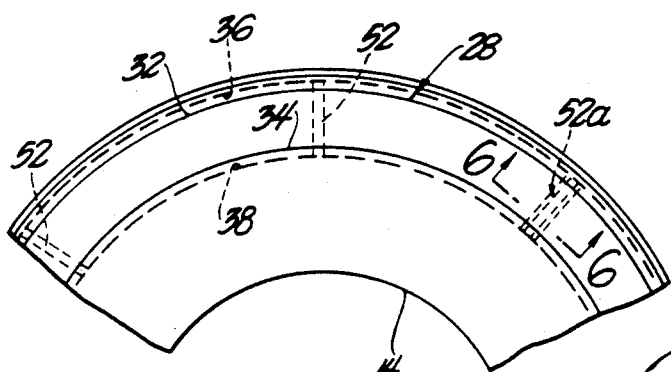
FIG. 5 is a partial side elevational view of an alternate embodiment of the road wheel assembly.

In FIGS. 3 and 5 is shown an optional modification to my improved road wheel assembly wherein ribs 52 are formed integrally with spider 14. Ribs 52 extend radially across pocket 35 so as to divide annular the pocket into arcuate sections. The ribs extend part way from bed 42 toward surface 30 as seen in FIG. 3. The purpose of ribs 52 is to prevent wear ring 28 from abradingly sliding within pocket 35.

Figure 6:
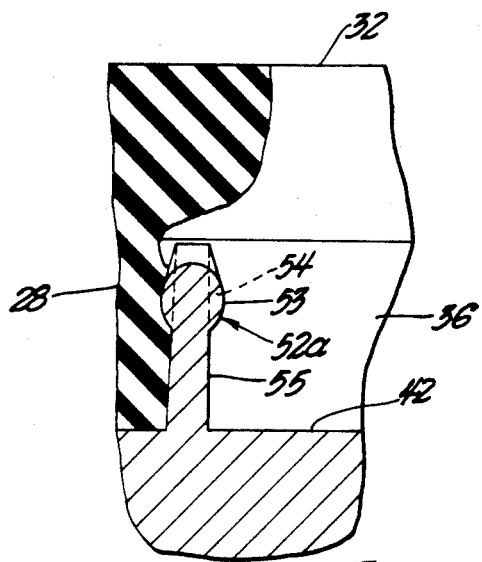
FIG. 6 is a sectional view taken along line 6—6 in FIG. 5.

A second kind of rib is shown at 52a in FIGS. 4 and 6 wherein the edge of the wall more remote from bed 42 defines a laterally bulging edge zone 53 between the radially inner and outer ends of rib 52a. Edge zone 53 can be formed by a forging die component (not shown) striking the top of rib 52a, which has a pre-forging shape similar to radially outer rib end 54. Rib 52a has a neck 55 narrower than edge zone 53, whereby zone 53, neck 55 and bed 42 define concavities running along opposite sides of rib 52a. Portions of wear ring 28 fit snugly within the concavities to form a physical lock to retain the wear ring in wheel assembly 10. It is preferred that the concavities extend a smaller distance from bed 42 than do undercuts 36 and 38 so that ribs 52a lock wear ring 28 to wheel assembly 10 even after flanges 32 and 34 have been worn away, whereby the useful life of the wear ring is extended.

I wish it to be understood that I do not desire to be limited to the exact details of construction shown and described herein since obvious modifications will occur to those skilled in the relevant arts without departing from the spirit and scope of the following claims.

I claim:

1. A road wheel assembly for engaging track center guides on a tracked vehicle, the road wheel assembly having two wheel halves together defining a channel around the wheel assembly, the improvement comprising:
    a wear ring in each channel, the ring comprised of a matrix material and particles in the matrix material, the matrix material being tougher and more flexible than the particles, the ceramic material being harder and more abrasion resistant than either the wheel halves or the matrix material;
    the channels defining pockets in which the wear rings are located;
    pairs of flanges at the pockets trapping the wear rings in the pockets;
    beds on the inner peripheral surfaces of the pockets;
    radial ribs on the beds dividing the pocket into arcuate sections;
    portions of the wear ring protruding into and closely fit into the arcuate sections.

2. The road wheel assembly of claim 1 wherein the ribs extend a smaller distance from the planes in which lie the beds than do the flanges.

3. The road wheel assembly of claim 1 wherein the particles have rough irregular surfaces interfaced with the matrix material.

4. The road wheel assembly of claim 1 wherein the flanges define undercuts in the pockets, the assembly including means for preventing relative rotation between the annular wear ring and the pocket, the preventing means including roughened surfaces on the undercuts.

5. The road wheel of claim 4 wherein bed surfaces of the pocket are parallel to the wear surface of the annular wear ring, the bed surfaces faced against and adhered to the annular rings.

6. The road wheel assembly of claim 1 wherein the curved flanges are are at least partially sacrificial elements, the curved flanges being integral with the spider and are formed of a material softer than the material of the track center guide, so that the center guide wear away the flanges without appreciable damage to the center guide being caused by the flanges.

7. The road wheel assembly of claim 1 wherein some of the particles protrude out of the matrix material, the protruding particles having smooth flat surfaces all disposed in a common plane with respect to which the matrix material is recessed.

8. A road wheel assembly for engaging the track and track center guides on a tracked vehicle, the road wheel assembly comprising two wheel halves, each wheel half comprising a rim and a spider integral with one edge of the rim, the spider and rim being made of a relatively soft metal; the spiders of the respective wheel halves joined face to face at the spiders and the outer peripheries of the spiders together defining a circumferential channel, the improvement comprising:

an annular wear ring in an outer peripheral zone of each spider, the ring comprised of a matrix material and ceramic particles in the matrix material, the matrix material being tougher and more flexible than ceramic material from which the particles are formed, the ceramic material being harder and more abrasion resistant that the relatively soft metal and the matrix material;

the outer peripheral zones defining annular pockets in which the wear rings conformingly fit;

beds on the inner perpheral surfaces of the pockets;

a pair of flanges at each outer peripheral zone and integral with the outer peripheral zone, the flanges extending from the sides of the pocket toward each other so as to define undercuts in the annular pocket, the flanges keeping the annular wear ring trapped in the pocket, the undercuts having roughened surfaces in adhesive contact with the matrix material;

the wear rings having a single smooth flat surface faced away from the spiders and flush with portions of the flanges most remote from planes in which the beds of the pockets lie, the smooth flat surfaces disposed parallel to the beds and tilted slightly in a radially outward direction so as to parallel and face a complimentary bearing surface of the track center guide;

the matrix material having a strong adhesive bond with the particles such that the particles at the smooth flat surfaces tend to be smooth rather than to be dislodged by contact with the center guide;

radial ribs extending from the beds part of the way to the wear surfaces, the radial ribs dividing the pocket into arcuate sections, portions of the wear ring protruding into and closely fit within the sections, the ribs extending a smaller distance from the planes in which lie the beds than do the flanges.

* * * * *